United States Patent
Wu et al.

(12)

(10) Patent No.: US 10,592,297 B2
(45) Date of Patent: Mar. 17, 2020

(54) USE MINIMAL VARIANCE TO DISTRIBUTE DISK SLICES TO AVOID OVER-COMMITMENT

(71) Applicant: VMware, Inc., Palo Alto, CA (US)

(72) Inventors: Xiaojin Wu, Shanghai (CN); Ping Chen, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 50 days.

(21) Appl. No.: 15/647,291

(22) Filed: Jul. 12, 2017

(65) Prior Publication Data

US 2019/0018592 A1   Jan. 17, 2019

(51) Int. Cl.
*G06F 9/50* (2006.01)
*G06F 3/06* (2006.01)

(52) U.S. Cl.
CPC ............ *G06F 9/5083* (2013.01); *G06F 3/061* (2013.01); *G06F 3/0604* (2013.01); *G06F 3/0631* (2013.01); *G06F 3/0653* (2013.01); *G06F 3/0665* (2013.01); *G06F 3/0689* (2013.01); *G06F 2209/502* (2013.01); *G06F 2209/5019* (2013.01)

(58) Field of Classification Search
None
See application file for complete search history.

(56) References Cited

U.S. PATENT DOCUMENTS

| 6,711,649 | B1 * | 3/2004 | Bachmat | G06F 3/061 |
| | | | | 710/18 |
| 8,539,197 | B1 * | 9/2013 | Marshall | G06F 13/00 |
| | | | | 711/112 |
| 2005/0060590 | A1 * | 3/2005 | Bradley | G06F 1/3203 |
| | | | | 713/320 |
| 2010/0306495 | A1 * | 12/2010 | Kumano | G06F 3/061 |
| | | | | 711/170 |
| 2015/0324255 | A1 * | 11/2015 | Kochunni | G06F 11/1448 |
| | | | | 711/162 |

\* cited by examiner

*Primary Examiner* — Charles J Choi
(74) *Attorney, Agent, or Firm* — Su IP Consulting

(57) ABSTRACT

An example method for balancing disk usages in a virtualized computing environment may include generating, by a storage manager configured to manage the virtualized computing environment, predicted-disk-utilizations for a plurality of physical disks provisioned to a virtual disk in the virtualized computing environment. In response to a determination that a first predicted-disk-utilization for a first physical disk selected from the plurality of physical disks exceeds a predetermined-utilization-threshold, the storage manager may generate a storage-balancing policy for splitting the virtual disk into a number of disk slices and distributing the number of disk slices to a subset of candidate physical disks selected from the plurality of physical disks, wherein the storage-balancing policy provides a minimum data-movement-variance for distributing of the number of disk slices to the subset of the candidate physical disks.

19 Claims, 5 Drawing Sheets

USE MINIMAL VARIANCE TO DISTRIBUTE DISK SLICES TO AVOID OVER-COMMITMENT

BACKGROUND

In a virtualized computing environment, a virtual disk may be backed by a storage resource that includes multiple physical disks. Some of the physical disks may become heavily utilized, leaving other physical disks under-utilized. If a virtual disk becomes over-committed with respect to its storage space, the virtual disk may no longer be able to handle the additional storage space requests, as the heavily-utilized physical disks are exhausted of their physical storage capacity. Without a balanced storage resource, an over-commitment situation may greatly impact the overall performance of the virtual disk.

DETAILED DESCRIPTION

Figure 1:
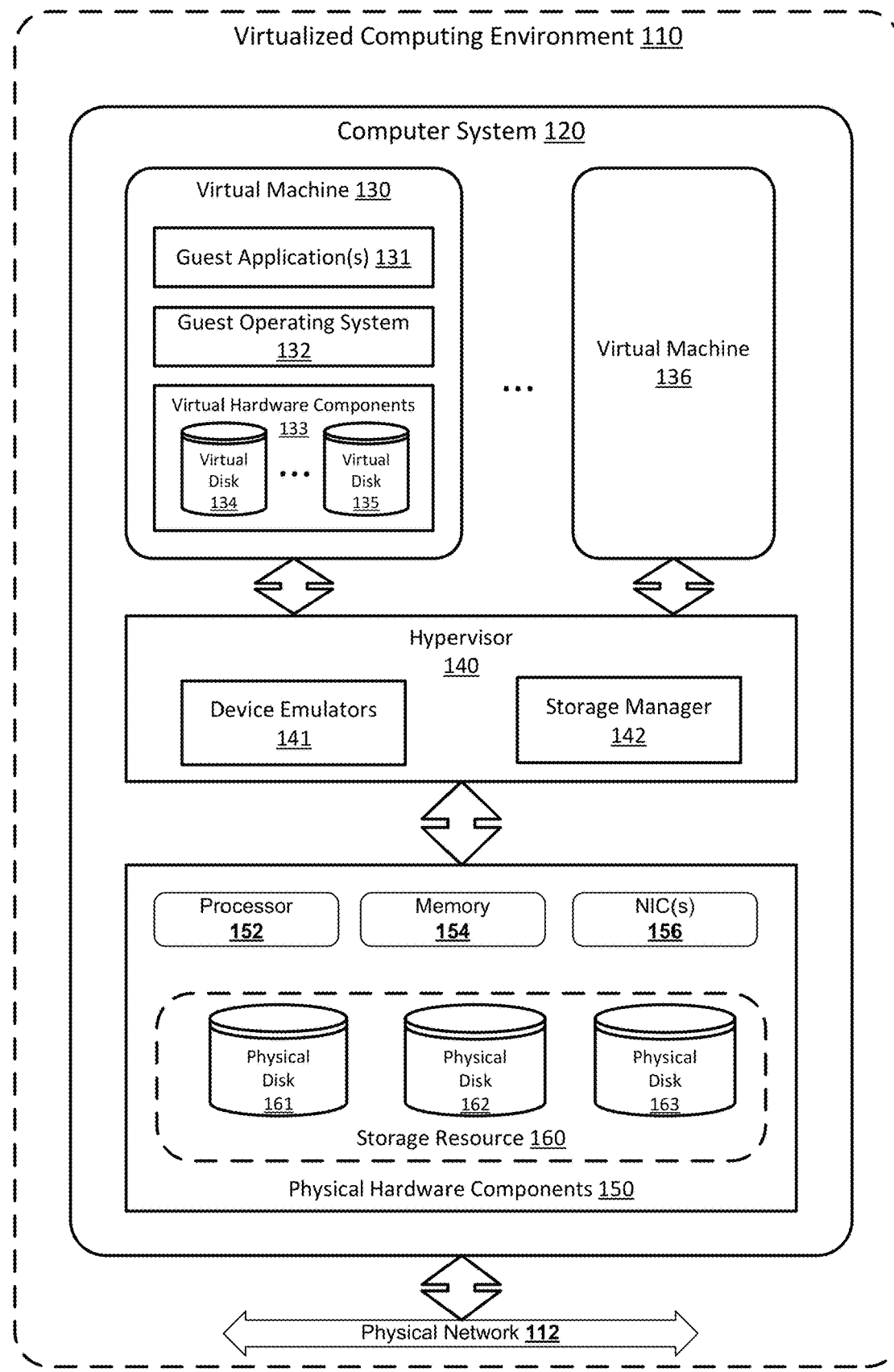
FIG. 1 illustrates a virtual machine environment configured to balance disk usages in a storage resource, according to one or more embodiments of the present disclosure.

The following detailed description refers to the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented here. Aspects of the present disclosure, as generally described herein, and illustrated in the Figures, can be arranged, substituted, combined, and designed in a wide variety of different configurations.

FIG. 1 illustrates a virtualized computing environment configured to balance disk usages in a storage resource, according to one or more embodiments of the present disclosure. In the example illustrated in FIG. 1, the virtualized computing environment 110 includes one or more computer systems 120 (also known as "host computers", "host devices", "physical servers", "server systems", etc.) connected via a physical network 112. Each computer system 120 includes physical hardware components 150 and a hypervisor 140 to support multiple virtual machines (VMs), such as a VM 130 and a VM 136. Throughout the present disclosure, the term "hypervisor" may refer to any suitable computer hardware virtualization software that enables multiple virtual machines to execute simultaneously on a single host, such as VMware ESX® (available from VMware, Inc.). In practice, each computer system 120 may support tens or hundreds of virtual machines (two shown for simplicity in FIG. 1). The term "hypervisor" also includes system-level software that supports namespace containers such as Docker, etc.

In some embodiments, the computer system 120 may be configured with various physical hardware components 150 including, without limitation, one or more physical Central Processing Units (CPUs) 152, memory 154, a Network Interface Card (NIC) 156, and/or additional electronic circuit components (not shown in FIG. 1). The physical hardware components 150 may also include a storage resource 160 having multiple physical disks 161, 162, and 163. Each of the physical disks 161, 162, and 163 may be a physical device having storage medium for data storage and data access. For example, a physical disk may be rotational hard drive using platters as storage mediums, a SSD-based device using flash-based memory, or a RAM-based storage medium. The physical disks in the storage resource 160 may provide various data storage services to the computer system 120.

The VM 130 and the VM 136 each represent a software implementation of a physical machine. The hypervisor allocates Virtual resources to the VM 130 and the VM 136. Corresponding to physical hardware components 150, virtual hardware resources 133 may include virtual CPU, virtual memory, virtual network interface controller (vNIC), virtual disks 134 and 135, etc. The physical hardware resources may be emulated using a device emulator 141 implemented by the hypervisor 114.

A guest operating system (OS) 132 and guest application(s) 131 may be installed and executed on the top of the virtual hardware components 133. The guest OS 132 may be a desktop operating system such as, without limitation, WINDOWS®, Apple OS®, Chrome®, Linux, or UNIX. The guest OS 132 may also be a mobile operating system such as, without limitation, Android®, or iOS®. From the perspectives of the guest OS 132 and the guest application(s) 131, the virtual hardware resources 133, such as the virtual disks 134 and 135, may operate substantially the same as the physical disks having similar capacities in the physical hardware components 150.

In some embodiments, the hypervisor 140 may include a storage manager 142, which configures, manages, and monitors the virtual disks 134 and 135 as well as the storage resource 160, such as the physical hard disks 161, 162, and 163. Specifically, the storage manager 142 may manage the creation, access, and deletion of the virtual disks 134 and 135. For example, the storage manager 142 may utilize one or more virtual machine disk (VMDK) files to implement the virtual disk 134 or 135. Each VMDK file may be associated with a specific virtual disk and may look like a typical file in a file system. The storage manager 142 may convert the storage operations (e.g., read, write) performed on the virtual disks 134 and 135 to operations performed on the associated VMDK files. Further, the storage manager 142 may manipulate (e.g., copy, move, insert, append, cut, split, or merge) the VMDK files as any other files stored in the physical disks 161, 162, and 163.

In some embodiments, the storage manager 142 may configure/provision the virtual disk 134 or virtual disk 135 to be a "thin virtual disk" or a "thick virtual disk." In the case of provisioning a virtual disk to be a thick virtual disk, or "thick-provisioning", the storage manager 142 may reserve/provision/allocate the full amount of the virtual disk's configured storage space ("virtual storage size") on the physical disk(s) that are associated with the virtual disk. In other words, the amount of storage space on the physical disk(s) ("physical storage size") consumed by the thick virtual disk equals to the virtual disk's virtual storage size. For example, if the virtual storage size of a thick virtual disk is 100 gigabytes (GB), then the storage manager 142 may allocate the full 100 GB physical storage space in the associated physical disk(s) to this thick virtual disk.

On the other hand, if the virtual disk is thin-provisioned, the storage manager 142 does not reserve all of the virtual disk's virtual storage size on the associated physical disk(s). The physical storage size consumed by a thin virtual disk may be small to begin with, and may grow as more data are stored in the virtual disk. For example, if the virtual storage size of a thin virtual disk is 100 GB but the virtual disk only contains 10 GB of actual data, then the VMDK file associated with the virtual disk may have a physical storage size of 10 GB in the associated physical disk(s). Therefore, a thin virtual disk consumes less physical storage space on a physical disk. Regardless of thin or thick provisioning, the VM 130 and its guest OS 132 may consider the virtual disks 134 and 135 to have their maximum virtual storage size at initialization.

In some embodiments, when the upper limit of storage space configured for a thin-provisioned virtual disk exceeds the total amount of storage space that is available on the associated physical disks, an "over-commitment" event has occurred. In other words, when the thin-provisioned virtual disk's virtual storage size is larger than the maximum physical storage size that can be provided by the associated physical disks, even though the guest application 131 and/or the guest OS 132 may believe there is sufficient storage space on the virtual disk for additional data, the underlying physical disks may no longer be able to provide the additional physical storage space required by the virtual disk. In this case, an over-committed virtual disk may experience performance degradation or even cease to respond.

In some embodiments, the storage manager 142 may monitor the storage usage patterns of these virtual disks 134 and 135, and predict an allocation rate (or growth rate) of these virtual disks 134 and 135. Based on this allocation rate, the storage manager 142 may estimate whether any of the underlying physical disks associated with the virtual disk may encounter a potential over-commitment event soon. Further, the storage manager 142 may evaluate and monitor the physical disks 161, 162, and 163 for their disk capacities and disk utilizations, and predict whether the disk utilization of a specific physical disk may reach its disk capacity in the near future based on the allocation rate. If an over-commitment event is imminent, the storage manager 142 may then balance the storage usage of the physical disks by splitting the data stored in the virtual disk into multiple disk slices, and moving some of the disk slices from the specific physical disk to other physical disk(s) in the storage resource 160. In other words, the storage manager 142 may balance the disk utilizations of the physical disks in the storage resource 160, thereby avoiding/reducing the risk of over-commitments and optimizing the performances of the virtual disk and the physical disks. Additional details about predicting and balancing disk usages in the storage resource are further described below.

The various terms, layers and categorizations used to describe the virtualization components in FIG. 1 may be referred to differently without departing from their functionalities or the spirit and scope of the present disclosure. For example, one or more of the hypervisor 140 and its modules such as device emulators 141 and storage manager 142 may be implemented in another computer system, distinct from the computer system 120 that supports the VM 130 and the virtual hardware components 133. Also, through storage virtualization, the storage resource 160 in each of the multiple computer systems may be aggregated to form a distributed storage system, which represents a shared pool of storage resources. Such a distributed storage system may employ any suitable technology, such as Virtual Storage Area Network (VSAN) from VMware, Inc.

Figure 2:
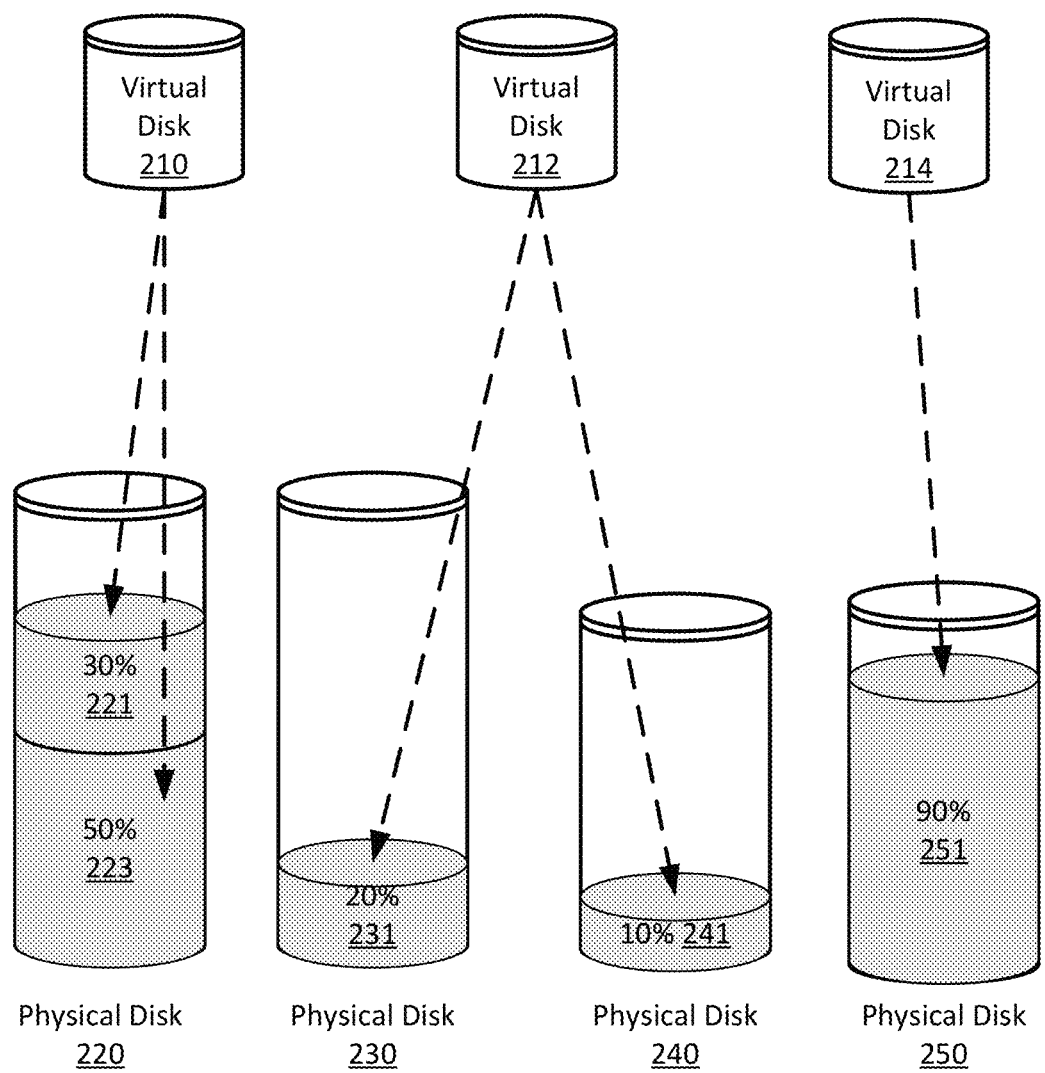
FIG. 2 illustrates multiple scenarios for balancing storage usages in a virtualized computing environment, according to one or more embodiments of the present disclosure.

FIG. 2 illustrates multiple scenarios for balancing storage usages in a virtualized computing environment, according to one or more embodiments of the present disclosure. In FIG. 2, a virtualized computing environment may contain one or more VMs utilizing multiple virtual disks 210, 212, and 214. A storage manager (e.g., storage manager 142 of FIG. 1) in the virtualized computing environment may configure the virtual disks 210, 212, and 214 based on a storage resource having one or more physical disks 220, 230, 240, and 250. For example, the storage manager may configure the virtual disk 210 based on the storage space provisioned/provided by the physical disk 220, configure the virtual disk 212 based on the storage space provisioned/provided by the physical disks 230 and 240, and configure the virtual disk 214 based on the storage space provisioned/provided by the physical disk 250.

In some embodiments, the storage manager may configure the virtual disks 210, 212, and 214 to be thin-provisioned, and may associate each of these virtual disks with one or more VMDK files. In other words, all data stored in a virtual disk may be stored in the VMDK file(s) associated with such a virtual disk. Each VMDK file may be stored in one physical disk. As illustrated in FIG. 2, the storage manager may associate the virtual disk 214 with a VMDK file 251, which is stored in the physical disk 250. In addition, a single virtual disk may be split/divided into multiple disk slices, each of which being supported by a corresponding VMDK file. In other words, data stored in this virtual disk may actually be stored in one or multiple of these disk slices or VMDK files. As illustrated in FIG. 2, the storage manager may configure the virtual disk 210 using two disk slices associated with VMDK file 221 and VMDK file 223, both of which are located in the same physical disk 220. Further, multiple disk slices for a single virtual disk may be spread/saved to multiple physical disks. In FIG. 2, the storage manager may divide/split the virtual disk 212 into two disk slices which are associated with VMDK file 231 and VMDK file 241 respectively. In this case, the VMDK file 231 and VMDK file 241 may be stored on two different physical disks 230 and 240, respectively.

In some embodiments, the storage manager may monitor the virtual disks 210, 212, and 214 for their data usage pattern and calculate an allocation rate for each of these virtual disks. Specifically, an "allocation rate" may refer to a growth rate for requiring/allocating additional storage space from the virtual disk during a period of time (e.g., hour, day, or week). The allocation rate may be described in a specific number value or in a percentage value. For example, an allocation rate of "10 GB/day" for the virtual disk 210 may indicate that a guest application requires the storing of an additional 10 GB of data to the virtual disk 210 for each additional day. Similarly, an allocation rate of "10%/week" may indicate that for each additional week, 10% of the virtual disk's storage capacity may need to be allocated for storing additional data.

In some embodiments, the storage manager may predict/estimate the allocation rate of a virtual disk based on a linear incremental method. Specifically, the storage manager may monitor the storage usage pattern and the data growth occurring to a virtual disk during a short period (e.g., hours), and generate the allocation rate by linearly incrementing the rate of such data growth to a specific time period (e.g., day). Further, the storage manager may generate the allocation rate by averaging the various allocation rates collected from different time periods or collected from different virtual disks. Based on the allocation rate, the storage manager may predict how much physical storage size will be needed after the virtual disk operates for a specific period of time (e.g., one week).

In some embodiments, the storage manager may monitor the physical disks 220, 230, 240, and 250 for their storage capacity and disk utilization. Specifically, "storage capacity" may refer to a physical disk's maximum storage capability, and may be described in units of storage measurement (e.g., 600 GB). "Disk utilization" may be used to measure and describe a physical disk's used/occupied storage space and/or its available/free storage space. Disk utilization may be described in a specific number value (e.g., 200 GB) or a percentage value. When using a percentage value (e.g., 60%), the disk utilization may refer to what percentage of storage capacity may have already been used or occupied. Further, "current-disk-utilization" may describe the storage space currently used/occupied in a physical disk; and "predicted-disk-utilization" may refer to the storage space in the physical disk that are predicted to be used/occupied at a predetermined specific time in the future.

In some embodiments, based on the allocation rate estimated for the virtual disks, the storage manager may generate a predicted-disk-utilization for each of the physical disks 220, 230, 240, and 250. Specifically, the storage manager may first evaluate/collect each physical disk's current-disk-utilization. Based on the estimated allocation rate, the storage manager may calculate how much additional storage space may be required for a specific physical disk, and generate a predicted-disk-utilization for the physical disk by adding the additional required storage space and the physical disk's current-disk-utilization. The storage manager may then use the predicted-disk-utilization to evaluate whether a physical disk may face potential storage shortage in the future.

In some embodiments, the storage manager may evaluate the predicted-disk-utilization of a physical disk against a predetermined-utilization-threshold, in order to determine whether there is any over-commitment risk for an associated virtual disk. Specifically, the predetermined-utilization-threshold may be a percentage (e.g., 90%) of the disk capacity. When the predicted-disk-utilization reaches or goes above this predetermined-utilization-threshold, it means there will be less than 10% of the storage capacity available on this physical disk, which may affect the performance of this physical disk. Alternatively, the predetermined-utilization-threshold may be a number (e.g., 10 GB). In this case, the storage manager may compare the predicted-disk-utilization of the physical disk with the physical disk's storage capacity, and if the difference is smaller than the predetermined-utilization-threshold, it may determine that the over-commitment of the associated virtual disk may occur soon.

In some embodiments, the storage manager may balance those physical disks having predicted-disk-utilizations that exceed the predetermined-utilization-threshold. Specifically, "balancing" or "rebalancing" may broadly refer to an operation to move data from one physical disk to other physical disks, in order to reduce the over-commitment risks potentially faced by the associated virtual disk. The storage manager may balance the physical disk by dividing/splitting the virtual disk into multiple disk slices, and move/rearrange the storing of these multiple disk slices to physical disks in the storage resource that have sufficient physical storage space available.

In some embodiments, the storage manager may balance a physical disk by splitting/dividing the virtual disk originally associated with the physical disk ("original physical disk"). "Splitting" or "dividing" a virtual disk into multiple disk slices may refer to an operation to create new VMDK files (corresponding to the multiple disk slices) based on VMDK files originally associated with the virtual disk ("original VMDK files"). In other words, before splitting, the virtual disk may be associated with one or more original VMDK files stored in the original physical disk. The splitting operation may create new VMDK files, which may individually have smaller physical storage sizes than, but collectively have the same size as, the original VMDK files. Further, the new VMDK files may be created in the same or different physical disks compared to the original physical disk. Afterward, the storage manager may copy storage data from the original VMDK files into the new VMDK files, and optionally removed the original VMDK files once the data copying is completed. Thus, during a splitting operation, storage data in the virtual disk are not lost, but distributed via disk slices from original VMDK files to new VMDK files, and from the original physical disk to those physical disks that store the new VMDK files.

In some embodiments, the storage manager may add into a "monitoring queue" the thin-provisioned virtual disks in the virtualized computing environment that may face over-commitment in the future. The storage manager may perform periodical monitoring of the virtual disks in this monitoring queue, and estimate corresponding allocation rates for these virtual disks. Based on the corresponding allocation rate of a monitored virtual disk, the storage manager may estimate predicted-disk-utilizations for the virtual disk's underlying physical disks, and evaluate the predicted-disk-utilizations against the predetermined-utilization-threshold. If the storage manager determines that a physical disk's predicted-disk-utilization may exceed the predetermined-utilization-threshold in a given time period, the storage manager may add this physical disk into an "action queue" for balancing. After balanced all the physical disks in the action queue as described below, the storage manager may then go to sleep and wake up after a period of time to perform the above process again.

Figure 3A:
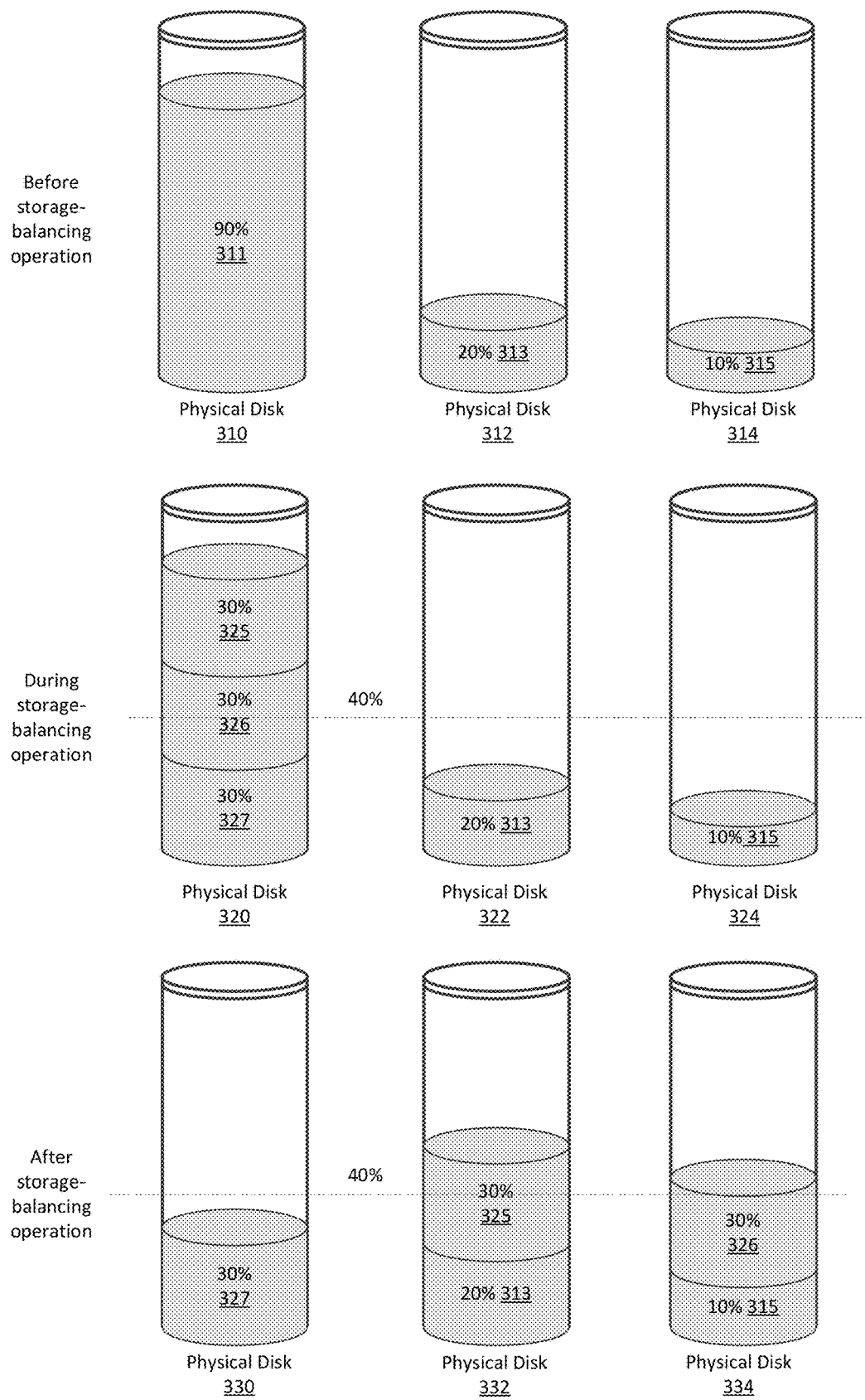
FIG. 3A illustrates multiple scenarios for moving storage data from a physical disk using multiple same-sized disk slices, according to one or more embodiments of the present disclosure.

FIG. 3A illustrates multiple scenarios for moving storage data from a physical disk using multiple same-sized disk slices, according to one or more embodiments of the present disclosure. In FIG. 3A, a storage manager (e.g., the storage manager 142 of FIG. 1) may determine that the predicted-disk-utilization of a physical disk 310 exceeds the predetermined-utilization-threshold. In this case, the storage manager may perform a "storage-balancing operation" by reviewing all physical disks (e.g., 310, 312, and 314) and generating a storage-balancing policy for distributing/moving storage data from physical disk 310 to other physical disks with more available physical storage spaces. For example, the storage manager may split the virtual disk associated with physical disk 310 into three disk slices, and distribute these three disk slices across the three physical disks 310, 312, and 314. Afterward, the disk utilization of the physical disk 310 may be decreased, thereby greatly reduce the possibility of over-commitment and storage exhaustion when the virtual disk requesting for additional storage spaces. In FIG. 3A, for clarification purposes, the illustrated physical disks 320 and 330 correspond to snapshots of the physical disk 310 during and after the storage-balancing operation. Likewise, the illustrated physical disks 322 and 332 correspond to snapshots of the physical disk 312, and the illustrated physical disks 324 and 334 correspond to snapshots of the physical disk 314, during and after the storage-balancing operation.

In some embodiments, the storage manager may create/generate a storage-balancing policy to determining how to balance the physical disk, as well as how to implement the storage-balancing operation. Specifically, a "storage-balancing policy" may include a set of configurations and instructions describing how many disk slices ("slice number"), as well as the sizes of these disk slices, the storage manager should split the virtual disk into. The storage-balancing policy may also describe how many candidate physical disks, as well as which physical disks, are selected and assigned for allocating these disk slices. The selected physical disks in the storage-balancing policy may be referred to as "candidate physical disks." Further, the storage-balancing policy may include a set of virtual disk and/or physical disk operations, when being executed by the storage manager, can perform certain storage balancing actions. For example, the storage-balancing policy may include operations such as splitting a virtual disk into a specific number of disk slices, and/or moving one or more disk slices from one physical disk to other physical disks. The storage manager may then perform the storage-balancing operation based on such a storage-balancing policy.

In some embodiments, the storage manager may generate multiple storage-balancing policies, and select a specific storage-balancing policy based on its data-movement-variance. A "data-movement-variance" for a storage-balancing policy may correspond to a measurement of how balanced the disk utilizations of a set of candidate physical disks are after the storage manager performs the operations defined in the storage-balancing policy. Further, the lower the data-movement-variance for a specific storage-balancing policy is, the more balanced the disk utilizations of the physical disks are after applying the storage-balancing policy. In other words, a low data-movement-variance may indicate that there are no large variations in terms of the physical disks' disk utilizations, or each of the physical disks may have a common (or substantial common) data utilization.

In some embodiments, "data-movement-variance" may also be a measurement of costs associated with performing the operations defined in a specific storage-balancing policy. Each operation (e.g., splitting, creating, moving, etc) in the storage-balancing policy may have a corresponding cost associated with. The cost may be in the amount of time, CPU utilization, memory utilization, disk read/write costs, and other computer system resources required by the storage manager to perform such operation. In other words, if the data-movement-variance of a first storage-balancing policy is lower than the data-movement-variance of a second storage-balancing policy, then the operations associated with the first storage-balancing policy may be more efficient than these operations of the second storage-balancing policy. Thus, the lower the data-movement-variance of a storage-balancing policy, the lower such storage-balancing policy may impact the performance of the VM and its virtual disks.

In some embodiments, to optimally balance disk utilizations of the physical disks in the virtualized computing environment, the storage manager may select from multiple storage-balancing policies a storage-balancing policy that has a minimum data-movement-variance. Specifically, the storage manager may identify the virtual disk that may have over-commitment risk in the specific physical disk, and generate multiple storage-balancing policies for the virtual disk and the specific physical disk. Each of the storage-balancing policies may describe a unique configuration of slice number, disk slice sizes, and candidate physical disks for the disk slices. Afterward, the storage manager may calculate a corresponding data-movement-variance for each of the storage-balancing policies, and select a storage-balancing policy with a minimum data-movement-variance as the one to perform on the virtual disk and the physical disk. In some embodiments, the "minimum data-movement-variance" may be the smallest data-movement-variance selected from the data-movement-variances of all the storage-balancing policies. Alternatively, the "minimum data-movement-variance" may be a relatively small data-movement variance selected from the data-movement-variances of some of the storage-balancing policies. In this case, the "minimum data-movement-variance" may be smaller than another data-movement variance associated with one of the storage-balancing policies, but may not be the absolute smallest data-movement-variance.

In some embodiments, to set up each storage-balancing policy, the storage manager may first choose a slice number indicating how many disk slices to be created from the virtual disk, and select a set of candidate physical disks that have sufficient physical storage spaces to accommodate the new disk slices. The storage manager may then define the sizes of these disk slices, and determine how to assign each of the disk slices to the corresponding candidate physical disks. Afterward, the storage manager may calculate a data-movement-variance associated with splitting the virtual disk into the number of disk slices, and creating these disk slices in the candidate physical disks.

In some embodiments, the storage manager may calculate the data-movement-variance for a storage-balancing policy based on the following Function 1:

$$\text{Var}(X) = \Sigma_{i=1}^{n}(X_i - \mu)^2 \quad (1)$$

where n denotes the slice number for splitting the virtual disk; i denotes a specific candidate physical disk selected from a set of candidate physical disks; $X_i$ is the disk utilization of a specific candidate physical disk i after balancing; $\mu$ denotes the average-disk-utilization of the set of candidate physical disks; and Var(X) is the data-movement-variance for the storage-balancing policy. Since the "average-disk-utilization" $\mu$ is calculated by averaging the disk utilizations of the candidate physical disks after a balancing operation, it may be used to show what optimally balanced physical disks should look like.

The examples in FIG. 3A may illustrate a storage-balancing policy that splits the virtual disk into three disk slices 325, 326, and 327, configuring the three disk slices with an equal size of 30% disk utilization of the physical disk 320, and selecting three candidate physical disks (e.g., physical disks 320, 322 and 324) to accommodate these three disk slices. Initially, the physical disk 310 contains a VMDK file 311, which occupies 90% of the storage capacity of the physical disk 310. The physical disk 312 contains a VMDK file 313, which occupies 20% of the storage capacity of the physical disk 312. The physical disk 314 contains a VMDK file 315, which occupies 10% of the storage capacity of the physical disk 314. The 90%, 20%, and 10% figures also correspond to the disk utilizations of the physical disks 310, 312, and 314, respectively.

During the storage-balancing operation, following the creation of the three disk slices 325, 326, and 327 and based on this storage-balancing policy, the storage manager may utilize the above Function 1 to calculate the data-movementvariance. Assuming the three candidate physical disks 320, 322, and 324 may have identical storage capacity, then the storage manager may calculate the average-disk-utilization p by dividing the accumulated disk utilizations of the three candidate physical disks by the number of the candidate physical disks (i.e., (90%+20%+10%)/3=40%).

In FIG. 3A, in accordance with the storage-balancing policy, the predicted outcome of the storage manager's assigning the disk slice 325 to physical disk 322, assigning the disk slice 326 to physical disk 324, and keeping the disk slice 327 in the physical disk 320 is illustrated by the physical disks 332, 334, and 330, respectively. Based on this outcome, the storage manager may determine that the data-movement-variance for this storage-balancing policy shall be 200, based on the above Function 1 and as shown below:

$$\text{Var}(X)=(30-40)^2+(50-40)^2+(40-40)^2=200$$

In some embodiments, the storage manager may generate multiple storage-balancing policies based on a slice number variable K (where $1<=K<=N$, and N may be a configurable value (e.g., 6) or equal to the maximum number of disk slices that is permitted by the VM). The storage manager may then iteratively go through the slice number variable K from 1 to N, and create corresponding disk slice sizes, candidate physical disks, and other setups based on this variable K. For example, for a specific slice number K (e.g., 3), the storage manager may generate a storage-balancing policy which would split the virtual disk into K number of same-size disk slices. For this storage-balancing policy, the storage manager may select K candidate physical disks that can accommodate these disk slices, and assign these K disk slices to the K candidate physical disks. Afterward, the storage manager may calculate a data-movement-variance corresponding to this storage-balancing policy.

In some embodiments, the storage manager may select the candidate physical disks from all physical disks based on disk utilizations of these physical disks after accommodated the disk slices. The storage manager may apply the disk slices to each of the physical disks in the storage resource, sort these physical disks based on their disk utilizations, and select the top K number of physical disks as the candidate physical disks. Alternatively, the storage manager may select the candidate physical disks based on the differences between the average-disk-utilization μ and the physical disks' respective disk utilizations after accommodating the disk slices.

In some embodiments, the storage manager may select the minimum data-movement-variance after generated and processed all storage-balancing policies which encompass all possible combinations of disk slices and candidate physical disks. Alternatively, to quickly find a minimum (or relative minimum) data-movement-variance within finite number of steps and without processing all storage-balancing policies, the storage manager may process the storage-balancing policies one at a time, and track the data-movement-variance during the process. As long as the data-movement-variances from the processed storage-balancing policies continue to decrease, the storage manager may continue to process the storage-balancing policies until when the storage-balancing policies associated with K+1 disk slices has bigger data-movement-variances than those of the storage-balancing policies associated with K disk slices. In this case, the storage manager may choose the storage-balancing policy with the smallest data-movement-variance as the one with the minimum data-movement-variance.

Figure 3B:
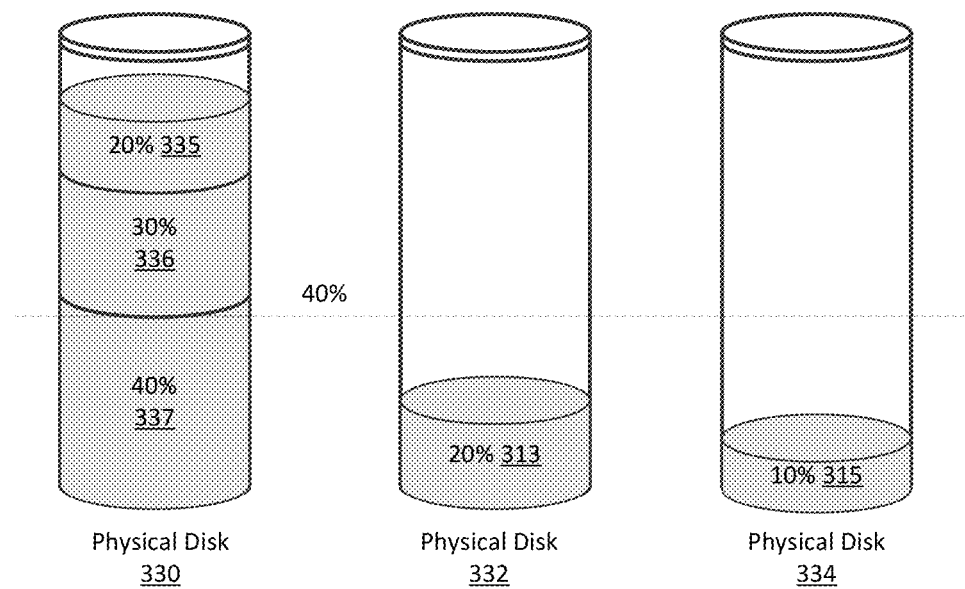
FIG. 3B illustrates multiple scenarios for moving storage data from a physical disk using multiple different-sized disk slices, according to one or more embodiments of the present disclosure.

FIG. 3B illustrates multiple scenarios for moving storage data from a physical disk using multiple different-sized disk slices, according to one or more embodiments of the present disclosure. In FIG. 3B, a storage manager (e.g., the storage manager 142 of FIG. 1) may determine that the physical disk 310 of FIG. 3A may have a predicted-disk-utilization exceeding the predetermined-utilization-threshold, and select a storage-balancing policy for disturbing the storage data from the physical disk 310 to other physical disks with more available storage spaces. Specifically, the storage manager may divide/split the virtual disk into multiple disk slices with different sizes, and distribute these disk slices to multiple physical disks 330, 332, and 334 as described below. For clarification purposes, physical disks 330 and 340 of FIG. 3B may show snapshots of the physical disk 310 of FIG. 3A during and after the storage-balancing operations. Likewise, physical disks 332 and 342 may show snapshots of the physical disk 312, and physical disks 334 and 344 may show snapshots of the physical disk 314, during and after the storage-balancing operations.

In some embodiments, to make sure that after the storage-balancing operations, the disk utilizations of the candidate physical disks are balanced and evenly distributed, the storage manager may split the virtual disk into disk slices according to the difference between each candidate physical disk's disk utilization and the average-disk-utilization μ (or "disk utilization difference"). For example, compared to the average-disk-utilization μ of 40%, the disk utilization of physical disk 322, which may be 20%, may have a 20% disk utilization difference. Likewise, the physical disk 324 may have a 30% disk utilization difference compared to the average-disk-utilization μ. Afterward, the storage manager may sort all the physical disks based on their respective disk utilization differences.

In some embodiments, the storage manager may generate multiple storage-balancing policies by iterating through splitting the virtual disk into K disk slices, where $1<=K<=N$. For each storage-balancing policy, the storage manager may split the K number of disk slices with sizes that correspond to the physical disks' disk utilization differences. Specifically, when the sum of the top K disk utilization differences equal to the predicted-disk-utilization for the virtual disk, the storage manager may split the virtual disk into disk slices that having the same sizes as the corresponding disk utilization differences. For example, for physical disk 332 having a disk utilization difference of 20%, the storage manager may create a disk slice 335 having the same size of 20%. Likewise, for physical disk 334 having a disk utilization difference of 30%, the storage manager may create a disk slice 336 having the same size of 30%. For physical disk 330 having the original VMDK file being redistributed, its disk utilization difference may be 40%. In this case, the storage manager may create a disk slice 337 having the same size of 40%.

In some embodiments, the physical disks 340, 342, and 344 may show the outcome of the storage-balancing policy as described above. Afterward, the storage manager may calculate its data-movement-variance using the above Function 1. Based on the example in FIG. 3B, the data-movement-variance shall be 0, which is most likely the minimum data-movement-variance. Thus, the storage manager may choose the disk slice-splitting configuration and physical disk selections shown in FIG. 3B as the preferred storage-balancing policy.

In some embodiments, when the sum of top K disk utilization differences is less than the sum of disk-utilizations of the K candidate physical disks after accommodating disk slices, the storage manager may first fill all those K candidate physical disks with their disk utilization differences, and then fill those K candidate physical disks with the rest of disk utilization differences proportionately based on the capacity of those K candidate physical disks. Afterward, the storage manager may calculate its data-movement-variance as described above.

In some embodiments, when the sum of top K disk utilization differences is more than the VMDK predicted-disk-utilization, the storage manager may first fill all those K physical disks to maximize their current usage of those disks. Afterward, the storage manager may continue fill those K physical disks with the rest of VMDK predicted-disk-utilization proportionately based on the capacity of those K physical disks, and calculate its data-movement-variance accordingly. For example, suppose K=3, and there are three physical disks A, B, and C having capacities of 100 GB, 200 GB, and 300 GB respectively. Suppose further that the utilization for the physical disks A, B, and C may be 20% (20 GB utilized), 10% (20 GB utilized), and 30% (90 GB utilized), respectively. Suppose the predicted-disk-utilization is 100 GB for the three disks; the sum of the top 3 differences is more than 100 GB; and the max current usage of these disks is 30%. In this case, the storage manager may fill two of the disks to 30% utilization first. That is, the storage manager may allocate 10 GB to disk A (reaching 30 GB and 30% utilization) and 40 GB to disk B (reaching 60 GB and 30% utilization), thereby making all three disks having 30% disk utilization. The remaining space yet to be allocated, which is 100 GB-10 GB-40 GB=50 GB, shall be allocated to the three disks according to the capacity proportional rate of 1:2:3. Therefore, the storage manager may allocate $50*1/6=8.33$ GB to the disk A, $50*2/6=16.67$ GB to the disk B, and $50*3/6=25$ GB to the disk C.

Figure 3B:
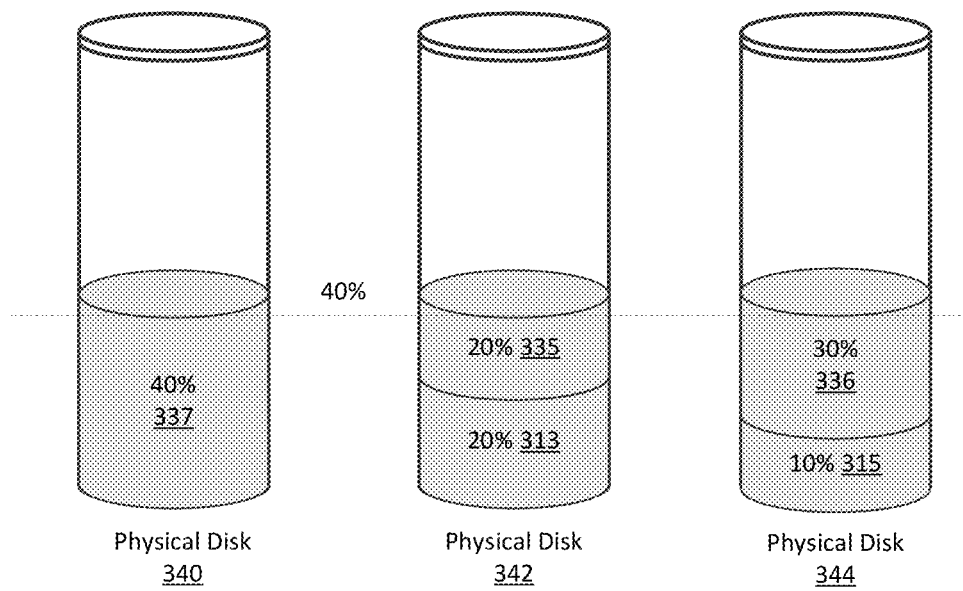
Figure 4:
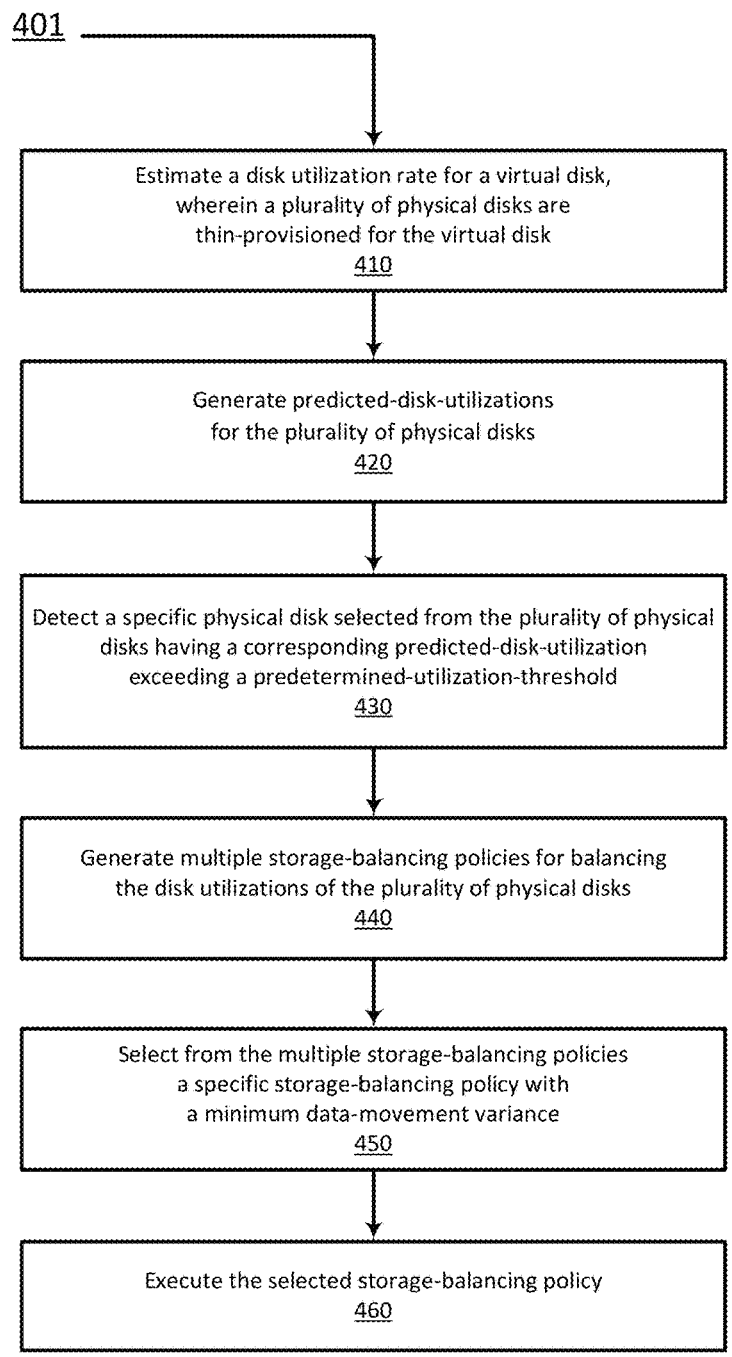
FIG. 4 shows a flow diagram illustrating a process to balance disk usages in a virtualized computing environment, according to one or more embodiments of the present disclosure.

FIG. 4 shows a flow diagram illustrating a process to balance disk usages in a virtualized computing environment, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a storage manager, such as the storage manager 142 of FIG. 1, may be configured to manage the virtualized computing environment. The virtualized computing environment may include a virtual disk and a plurality of physical disks thin-provisioned for the virtual disk. The storage manager may estimate an allocation rate for the virtual disk by monitoring the storage usage patterns of the virtual disk. In some embodiments, the virtual disk is associated with a VMDK file stored in one of the plurality of physical disks, such as the physical disks in the storage resource 160 of FIG. 1.

At block 420, the storage manager may generate predicted-disk-utilizations for the plurality of physical disks. In some embodiments, the storage manager may estimate an allocation rate by monitoring storage usage patterns of the virtual disk, and calculate the corresponding predicted-disk-utilizations for each of the plurality of physical disks by applying a linear increment method using the current disk utilization and the allocation rate of the virtual disk.

At block 430, the storage manager may detect a specific physical disk selected from the plurality of physical disks having a corresponding predicted-disk-utilization exceeding a predetermined-utilization-threshold. In this case, the storage manager may determine that the specific physical disk is facing over-commitment risk, and identify the virtual disk having data stored in the specific physical disk for data re-distribution.

At block 440, the storage manager may generate multiple storage-balancing policies for balancing the disk utilizations of the plurality of physical disks. In some embodiments, each storage-balancing policy may be used for splitting the virtual disk into a specific number of disk slices. Each of the disk slices may be associated with a corresponding VMDK file that can be stored in one of the plurality of physical disks.

In some embodiments, each storage-balancing policy may contain configurations and instructions for distributing the specific number of disk slices to a subset of candidate physical disks selected from the plurality of physical disks. In some embodiments, the storage manager may create/allocate each of the specific number of disk slices with an equal amount of storage size, meaning each disk slice within the specific number of disks slices may have the same allocated storage size. Alternatively, the storage manager may create/allocate each of the specific number of disk slices with a corresponding storage size that, after distributing the specific number of disk slices to the subset of candidate physical disks, each of the subset of candidate physical disks may have an equal amount of disk utilization. In this case, the storage manager may allocate each disk slice within the specific number of disk slices with a corresponding storage size independent of the storage sizes of other disk slices in the specific number of disk slices.

In some embodiments, the storage manager may generate each storage-balancing policy by determining the specific number for splitting the virtual disk into disk slices, selecting the subset of candidate physical disks from the plurality of physical disks, and assigning the specific number of disk slices to the subset of candidate physical disks. The storage manager may select a slice-number from a predetermined range of numbers (e.g., 1 to N) for splitting the virtual disk and mapping the selected slice-number of disk slices to the subset of candidate physical disks. Further, the storage manager may select the subset of candidate physical disks from the plurality of physical disks based on a sorted order of disk utilizations of the plurality of physical disks. Alternatively, the storage manager may select the subset of candidate physical disks from the plurality of physical disks based on a sorted order of disk utilization differences for the plurality of physical disks.

At block 450, the storage manager may select from the multiple storage-balancing policies a specific storage-balancing policy with a minimum data-movement variance for distributing the specific number of disk slices to the subset of the candidate physical disks. In other words, a second storage-balancing policy select from the multiple storage-balancing policies may have a corresponding data-movement variance that is higher than the minimum data-movement variance.

In some embodiments, the storage manager may calculate a data-movement variance for a storage-balancing policy by calculating an average-disk-utilization based on disk utilizations of the candidate physical disks specified in the storage-balancing policy. The storage manager may then generate the data-movement-variance by evaluating the average-disk-utilization and disk utilizations of the candidate physical disks after accommodating the number of disk slices. After having calculated corresponding data-movement-variances from all the storage-balancing policies, the storage manager may select the specific storage-balancing policy with the minimum data-movement-variance by comparing these corresponding data-movement-variances.

Specifically, the storage manager may select a first-choice number (e.g., a slice number selected from a predetermined range of numbers) of disk slices and a first-choice number of candidate physical disks from the plurality of physical disks. Each of the first-choice number of candidate physical disks contains storage space that can accommodate one of the first-choice number of disk slices. Afterward, the storage manager may calculate a first average-disk-utilization based on disk utilizations of the first-choice number of candidate physical disks. The storage manager may also calculate a first data-movement-variance by evaluating the first average-disk-utilization and disk utilizations of the first-choice number of candidate physical disks after accommodating the first-choice number of disk slices.

Likewise, the storage manager may select a second-choice number (e.g., another slice number selected from the predetermined range of numbers and is different from the first-choice number) of disk slices and a second-choice number of candidate physical disks from the plurality of physical disks. Each of the second-choice number of candidate physical disks contains storage space that can accommodate one of the second-choice number of disk slices. The storage manager may then calculate a second average-disk-utilization based on disk utilizations of the second-choice number of candidate physical disks, and calculate a second data-movement-variance by evaluating the second average-disk-utilization and disk utilizations of the second-choice number of candidate physical disks after accommodating the second-choice number of disk slices. Afterward, the storage manager may select the minimum data-movement-variance by comparing the first data-movement-variance and the second data-movement-variance.

At block 460, the storage manager may execute the selected storage-balancing policy to move storage data from the specific physical disk to the subset of candidate physical disks.

Thus, systems and methods for balancing disk usages in a virtualized computing environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-ft or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for balancing disk usages in a virtualized computing environment, the method comprising:
   generating, by a storage manager configured to manage the virtualized computing environment, predicted-disk-utilizations for a plurality of physical disks provisioned to a virtual disk in the virtualized computing environment;
   in response to a determination that a first predicted-disk-utilization for a first physical disk selected from the plurality of physical disks exceeds a predetermined-utilization-threshold, generating, by the storage manager, a first storage-balancing policy for splitting the virtual disk into a first number of disk slices and distributing the first number of disk slices to a first subset of candidate physical disks selected from the plurality of physical disks, wherein the first storage-balancing policy provides a minimum data-movement-variance for distributing the first number of disk slices to the first subset of the candidate physical disks; and
   executing, by the storage manager, the first storage-balancing policy to split the virtual disk into the first number of disk slices and distribute the first number of disk slices to the first subset of candidate physical disks.

2. The method as recited in the claim 1, wherein each disk slice within the first number of disk slices is allocated with an equal amount of storage size.

3. The method as recited in the claim 1, wherein each disk slice within the first number of disk slices is allocated with a corresponding storage size independent of storage sizes of other disk slices in the first number of disk slices, and after distributing the first number of disk slices to the first subset of candidate physical disks, each of the first subset of candidate physical disks has an equal amount of disk utilization.

4. The method as recited in the claim 1, wherein the generating of the predicted-disk-utilizations for the plurality of physical disks comprises:
   estimating an allocation rate by monitoring storage usage patterns of the virtual disk; and
   generating a corresponding predicted-disk-utilization for each of the plurality of physical disks based on the allocation rate.

5. The method as recited in the claim 1, wherein the generating of the first storage-balancing policy comprises:

determining the first number of disk slices by selecting the first number from a predetermined range of numbers for splitting the virtual disk; and
mapping the first number of disk slices to the first subset of candidate physical disks.

6. The method as recited in the claim 5, wherein for a second storage-balancing-policy generated by the storage manager for splitting the virtual disk into a second number of disk slices and distributing the second number of disk slices to a second subset of candidate physical disks selected from the plurality of physical disks, the second storage-balancing-policy has a higher data-movement-variance than the minimum data-movement-variance of the first storage-balancing policy.

7. The method as recited in the claim 1, wherein the generating of the first storage-balancing policy comprises:
   selecting a first-choice number of disk slices and a first-choice number of candidate physical disks from the plurality of physical disks, wherein each of the first-choice number of candidate physical disks contains storage space that can accommodate one of the first-choice number of disk slices;
   calculating a first average-disk-utilization based on disk utilizations of the first-choice number of candidate physical disks; and
   calculating a first data-movement-variance by evaluating the first average-disk-utilization and disk utilizations of the first-choice number of candidate physical disks after accommodating the first-choice number of disk slices.

8. The method as recited in the claim 7, wherein the generating of the first storage-balancing policy further comprises:
   selecting a second-choice number of disk slices and a second-choice number of candidate physical disks from the plurality of physical disks, wherein each of the second-choice number of candidate physical disks contains storage space that can accommodate one of the second-choice number of disk slices; and
   calculating a second average-disk-utilization based on disk utilizations of the second-choice number of candidate physical disks;
   calculating a second data-movement-variance by evaluating the second average-disk-utilization and disk utilizations of the second-choice number of candidate physical disks after accommodating the second-choice number of disk slices; and
   selecting the minimum data-movement-variance by comparing the first data-movement-variance and the second data-movement-variance.

9. A non-transitory computer-readable storage medium, containing a set of instructions which, in response to execution by a processor, cause the processor to perform a method for balancing disk usage in a virtualized computing environment, the method comprising:
   estimating, by a storage manager configured to manage the virtualized computing environment, an allocation rate for a virtual disk in the virtualized computing environment that is thin-provisioned based on a plurality of physical disks;
   generating, by the storage manager, a corresponding predicted-disk-utilization for each of the plurality of physical disks based on the allocation rate;
   for a first physical disk selected from the plurality of physical disks and having a corresponding predicted-disk-utilization exceeding a predetermined-utilizationthreshold, identifying, by the storage manager, the virtual disk having data stored in the first physical disk;

generating, by the storage manager, a storage-balancing policy for splitting the virtual disk into a specific number of disk slices and distributing the specific number of disk slices to a subset of candidate physical disks selected from the plurality of physical disks, wherein the storage-balancing policy provides a minimum data-movement-variance for moving data from the first physical disk to the subset of the candidate physical disks; and executing, by the storage manager, the storage-balancing policy to split the virtual disk into the specific number of disk slices and distribute the specific number of disk slices to the subset of candidate physical disks.

10. The non-transitory computer-readable storage medium of the claim 9, wherein the virtual disk is associated with a VMDK file stored in the first physical disk, and the specific number of disk slices is associated with a set of VMDK files that can be stored to the subset of candidate physical disks.

11. The non-transitory computer-readable storage medium of the claim 9, wherein the storage manager selects the subset of candidate physical disks from the plurality of physical disks based on a sorted order of disk utilizations of the plurality of physical disks.

12. The non-transitory computer-readable storage medium of the claim 9, wherein the storage manager selects the subset of candidate physical disks from the plurality of physical disks based on a sorted order of disk utilization differences for the plurality of physical disks.

13. The non-transitory computer-readable storage medium of the claim 9, wherein the generating of the corresponding predicted-disk-utilization comprises:

calculating the corresponding predicted-disk-utilization using a linear increment method based on the allocation rate.

14. The non-transitory computer-readable storage medium of the claim 9, wherein the generating of the storage-balancing policy comprises:

iterating through a range of slice numbers to generate a plurality of storage-balancing policies;

calculating a corresponding data-movement-variance for each of the plurality of storage-balancing policies; and selecting the storage-balancing policy from the plurality of storage-balancing policies for having the minimum data-movement-variance.

15. A system for balancing disk usage in a virtualized computing environment, the system comprising:

a plurality of physical disks;

a virtual disk thin-provisioned based on the plurality of physical disks; and a storage manager coupled with the virtual disk and the plurality of physical disks, wherein the storage manager is configured to generate predicted-disk-utilizations for the plurality of physical disks, in response to a determination that a corresponding predicted-disk-utilization for a specific physical disk selected from the plurality of physical disks will exceed a predetermined-utilization-threshold, generate a storage-balancing policy for splitting the virtual disk into a specific number of disk slices and distributing the specific number of disk slices to a subset of candidate physical disks selected from the plurality of physical disks, wherein the storage-balancing policy provides a minimum data-movement-variance for distributing of the specific number of disk slices to the subset of the candidate physical disks, and execute the storage-balancing policy to split the virtual disk into the specific number of disk slices and distribute the specific number of disk slices to the subset of candidate physical disks.

16. The system of claim 15, wherein the storage manager further generates the predicted-disk-utilizations for the plurality of physical disks by:

estimating an allocation rate by monitoring storage usage patterns of the virtual disk; and generating a corresponding predicted-disk-utilization for each of the plurality of physical disks based on the allocation rate.

17. The system of claim 15, wherein the storage manager further generates the storage-balancing policy by selecting the specific number from a predetermined range for splitting the virtual disk;

selecting the subset of candidate physical disks from the plurality of physical disks for containing storage space that can accommodate one of the specific number of disk slices; and mapping the specific number of disk slices to the subset of candidate physical disks.

18. The system of claim 17, wherein the storage manager selects the subset of candidate physical disks from the plurality of physical disks based on a sorted order of disk utilization differences for the plurality of physical disks.

19. The system of claim 15, wherein the storage manager further generates the storage-balancing policy by iterating through a range of slice numbers to generate a plurality of storage-balancing policies;

calculating a corresponding data-movement-variance for each of the plurality of storage-balancing policies; and selecting the storage-balancing policy from the plurality of storage-balancing policies for having the minimum data-movement-variance.

* * * * *